United States Patent
Arad

(10) Patent No.: US 8,320,823 B2
(45) Date of Patent: Nov. 27, 2012

(54) DIGITAL RADIO BROADCAST TRANSMISSION USING A TABLE OF CONTENTS

(75) Inventor: Oren Arad, Palo Alto, CA (US)

(73) Assignee: SiPort, Inc., Santa Clara, CA (US)

( * ) Notice: Subject to any disclaimer, the term of this patent is extended or adjusted under 35 U.S.C. 154(b) by 401 days.

(21) Appl. No.: 12/773,835

(22) Filed: May 4, 2010

(65) Prior Publication Data

US 2010/0330900 A1     Dec. 30, 2010

Related U.S. Application Data

(60) Provisional application No. 61/175,322, filed on May 4, 2009.

(51) Int. Cl.
*H04Q 7/20* (2006.01)
(52) U.S. Cl. ............ 455/3.04; 455/3.01; 455/3.03; 455/3.06; 455/3.05; 455/426.1; 725/63; 725/64; 725/65; 725/68; 725/67; 370/310; 370/313; 370/329; 370/343
(58) Field of Classification Search .......... 455/3.04, 455/3.01, 3.03, 3.05, 3.06, 422.1, 403, 414.1–414.4, 455/550, 500, 517, 412.1, 412.2, 445, 509, 455/426.1, 426.2; 725/62–72; 370/310, 370/313, 329, 343
See application file for complete search history.

(56) References Cited

U.S. PATENT DOCUMENTS

| | | |
|---|---|---|
| 4,710,747 A | 12/1987 | Holland |
| 4,761,644 A | 8/1988 | Kawai et al. |
| 4,910,752 A | 3/1990 | Yester, Jr. et al. |
| 5,140,698 A | 8/1992 | Toko |
| 5,155,479 A | 10/1992 | Ragan |
| 5,325,088 A | 6/1994 | Willard et al. |
| 5,555,183 A | 9/1996 | Willard et al. |
| 5,654,952 A | 8/1997 | Suzuki |
| 5,920,824 A | 7/1999 | Beatty et al. |
| 6,031,827 A | 2/2000 | Rikkinen et al. |
| 6,057,795 A | 5/2000 | Suzuki |
| 6,072,784 A | 6/2000 | Agrawal et al. |
| 6,205,225 B1 | 3/2001 | Orban |
| 6,219,333 B1 | 4/2001 | Ahn |
| 6,232,905 B1 | 5/2001 | Smith et al. |
| 6,259,681 B1 | 7/2001 | Kolev et al. |
| 6,286,122 B1 | 9/2001 | Alanara |
| 6,311,048 B1 | 10/2001 | Loke |
| 6,317,065 B1 | 11/2001 | Raleigh |
| 6,405,062 B1 | 6/2002 | Izaki |
| 6,405,602 B1 | 6/2002 | Itou et al. |

(Continued)

FOREIGN PATENT DOCUMENTS

JP     2007-243504     9/2007

*Primary Examiner* — Keith Ferguson
(74) *Attorney, Agent, or Firm* — Carr & Ferrell LLP

(57) ABSTRACT

For each audio and data service, a table of contents (TOC) specifies which logical channel may carry data. The TOC may be transmitted over the NRSC-5 transmission system using a pre-defined protocol, which is received and decoded at an NRSC-5 receiver apparatus that extracts the TOC. When a user or an application requests a specific service from the receiver, the receiver logic may examine the TOC and may identify which LC may carry the requested service data. The receiver may only decode the LCs that are needed for the requested service, and may not decode other unneeded LCs thereby conserving power and memory.

23 Claims, 5 Drawing Sheets

| Service type<br>0 – audio<br>1 – data | Program number or Port number | Logical Channel | Audio stream type<br>0 – core<br>1 – enhanced<br>N/A for data service |
|---|---|---|---|
| 0 | 1 | P1 | 0 |

| | | | |
|---|---|---|---|
| 0 | 2 | P1 | 0 |
| 0 | 3 | P3 | 1 |
| 1 | 1032 | P3 | |
| 1 | 1076 | P4 | |

U.S. PATENT DOCUMENTS

| | | | |
|---|---|---|---|
| 6,407,689 B1 | 6/2002 | Bazarjani et al. |
| 6,438,364 B1 | 8/2002 | Waite |
| 6,466,913 B1 | 10/2002 | Yasuda |
| 6,504,863 B1 | 1/2003 | Hellmark |
| 6,654,595 B1 | 11/2003 | Dexter |
| 6,671,371 B1 | 12/2003 | McNeill et al. |
| 6,693,953 B2 | 2/2004 | Cox et al. |
| 6,754,763 B2 | 6/2004 | Lin |
| 6,763,240 B1 | 7/2004 | Chambers |
| 6,765,931 B1 | 7/2004 | Rabenko et al. |
| 6,819,274 B2 | 11/2004 | Krone et al. |
| 6,862,325 B2 | 3/2005 | Gay-Bellile et al. |
| 7,006,617 B1 | 2/2006 | Del Farra |
| 7,127,008 B2 | 10/2006 | Kroeger |
| 7,205,923 B1 | 4/2007 | Bahai |
| 7,233,275 B2 | 6/2007 | Aksin et al. |
| 7,295,812 B2 | 11/2007 | Haapoja et al. |
| 7,299,021 B2 | 11/2007 | Pärssinen |
| 7,369,989 B2 | 5/2008 | Absar |
| 7,480,689 B2 | 1/2009 | Song |
| 7,512,743 B2 | 3/2009 | Tom et al. |
| 7,555,661 B2 | 6/2009 | Luu |
| 2002/0067825 A1 | 6/2002 | Baranowski et al. |
| 2002/0126778 A1 | 9/2002 | Ojard |
| 2002/0169009 A1 | 11/2002 | Reiner |
| 2003/0078007 A1 | 4/2003 | Parssinen et al. |
| 2003/0159076 A1 | 8/2003 | Delisle |
| 2004/0080675 A1 | 4/2004 | Hoshino |
| 2004/0145508 A1 | 7/2004 | Gulati et al. |
| 2004/0203537 A1 | 10/2004 | Yoshida et al. |
| 2004/0223449 A1 | 11/2004 | Tsuie et al. |
| 2005/0047488 A1 | 3/2005 | Sugahara |
| 2005/0081245 A1 | 4/2005 | Arad et al. |
| 2005/0094036 A1 | 5/2005 | Tichelaar |
| 2005/0094840 A1 | 5/2005 | Harano |
| 2005/0113136 A1 | 5/2005 | Gosieski, Jr. |
| 2005/0239518 A1 | 10/2005 | D'Agostino et al. |
| 2006/0001779 A1 | 1/2006 | Favrat et al. |
| 2006/0082690 A1 | 4/2006 | Englert |
| 2006/0112157 A1 | 5/2006 | Song |
| 2006/0141974 A1 | 6/2006 | Campbell et al. |
| 2006/0195498 A1 | 8/2006 | Dobbek |
| 2006/0212503 A1 | 9/2006 | Beckmann |
| 2007/0080800 A1 | 4/2007 | Carbone et al. |
| 2007/0105576 A1 | 5/2007 | Gupta et al. |
| 2007/0112901 A1 | 5/2007 | Niktash |
| 2007/0176816 A1 | 8/2007 | Wood |
| 2008/0086756 A1* | 4/2008 | Kagle et al. .................... 725/108 |
| 2008/0097764 A1 | 4/2008 | Grill |
| 2009/0198753 A1 | 8/2009 | Benjelloun Touimi |
| 2010/0150276 A1* | 6/2010 | Yew et al. ...................... 375/340 |

* cited by examiner

| Service Mode | Approximate Information Rate (kbit/s) | | | | | Waveform |
|---|---|---|---|---|---|---|
| | P1 | P2 | P3 | P4 | PIDS | |
| MP1 | 98 | N/A | N/A | N/A | 1 | Hybrid |
| MP2 | 98 | N/A | 12 | N/A | 1 | Extended Hybrid |
| MP3 | 98 | N/A | 25 | N/A | 1 | Extended Hybrid |
| MP11 | 98 | N/A | 25 | 25 | 1 | Extended Hybrid |
| MP5 | 25 | 74 | 25 | N/A | 1 | Extended Hybrid, All Digital |
| MP6 | 50 | 49 | N/A | N/A | 1 | Extended Hybrid, All Digital |

FIGURE 2

(PRIOR ART)

| Service type<br>0 – audio<br>1 – data | Program number or Port number | Logical Channel | Audio stream type<br>0 – core<br>1 – enhanced<br>N/A for data service |
|---|---|---|---|
| 0 | 1 | P1 | 0 |

| | | | |
|---|---|---|---|
| 0 | 2 | P1 | 0 |
| 0 | 3 | P3 | 1 |
| 1 | 1032 | P3 | |
| 1 | 1076 | P4 | |

FIGURE 4

| Service type<br>0 – audio<br>1 – data | Program number or Port number | Logical Channel | Audio stream type<br>0 – core<br>1 – enhanced<br>N/A for data service | Service region first byte<br>In bytes from start of frame | Service region last byte<br>In bytes from start of frame |
|---|---|---|---|---|---|
| 0 | 1 | P1 | 0 | 0 | 10000 |
| 0 | 2 | P1 | 0 | 10001 | 18271 |
| 0 | 2 | P3 | 1 | 0 | 255 |
| 1 | 1032 | P3 | | 226 | 575 |
| 1 | 1076 | P4 | | 0 | 575 |

FIGURE 5

DIGITAL RADIO BROADCAST TRANSMISSION USING A TABLE OF CONTENTS

CROSS-REFERENCE TO RELATED APPLICATION

The present applications claims the priority benefit of U.S. provisional application No. 61/175,322 filed May 4, 2009 and entitled "Digital Radio Broadcast Transmission System and Method," the disclosure of which is incorporated herein by reference.

BACKGROUND OF THE INVENTION

1. Field of the Invention

The present invention generally relates to radio broadcast transmission systems.

The present invention more specifically relates to a NRSC-5 transmission system incorporating a table of contents (TOC) listing program numbers for audio services and port numbers for data services.

2. Description of the Related Art

The increasingly popular High Definition (HD) Radio™ standard allows for simultaneous broadcast of digital and analog signals. HD Radio™ operates under standards adopted by the National Radio Systems Committee (NRSC). The NRSC-5 standard describes a digital radio frequency (RF) broadcast system that delivers digital audio and data services to receivers from terrestrial transmitters on existing Frequency Modulation (FM) and Amplitude Modulation (AM) radio. The NRSC-5 standard uses in-band over channel (IBOC) orthogonal frequency division multiplexing (OFDM) technology to carry digital data stream over the AM and FM bands. The system allows for coexistence of the digital modulated signal alongside the legacy analog FM and AM transmission whereby an NRSC-5 system can provide several services such multiple audio streams and data services in a single frequency band.

FIG. 1 illustrates an NRSC-5 IBOC system as is known in the art. An IBOC system can be partitioned into three subsystems, including audio and data input subsystems; transport and service multiplex subsystem; and RF/transmission subsystem.

The audio and data subsystem describes the encapsulation of audio streams and data streams into packets that can be sent over the system. The audio streams in the IBOC system include a primary audio stream (MPS) and may include one or more secondary audio streams (SPS). The source for the primary audio stream may be a duplication of the audio stream carried over the analog signal. The source for the secondary audio channels may be new audio content not available in the analog broadcast signal.

The digital audio sources streams are compressed by the audio transport layer and sent to the transport multiplex. Compressed audio streams may be partitioned into core and enhanced packets. Decoding only the core packets results in reduced quality audio. Decoding both core and enhanced packets results in higher quality audio. The digital data can have several different stream types: program service data (PSD); station information service (SIS) data; and advanced data services (ADS).

PSD may be transmitted with the audio stream. The PSD may provide information on the audio program heard by the radio listener. PSD may include song title, artist, album, genre, comment, commercial and reference identifiers.

The SIS data may provide general information about the station programming as well as technical information. SIS may also include station identification number, station call letters, station name, station location, and station time. SIS may also include an arbitrary text message.

ADS may be carried by any broadcast data services that may carry any form and content that can be expressed as a data file or a data stream, including audio services. Examples of such services may be presentations of stock, news, weather, real time traffic and entertainment programming including audio, text and images.

A transport and service multiplex subsystem receives a multiple audio and data input stream and organizes the data stream into packets. A service multiplex arranges packets from one or more services into a logical channel (LC) stream. An IBOC system transmits one or more LC streams. Each LC stream may contain one or more audio or data services. In some cases, a single service may have some of its data transmitted over two or more LC streams.

An RF/transmission subsystem receives the LC streams and performs channel coding and waveform generation. The RF/transmission subsystem then transmits the information to an RF receiver. Each logical stream is independently coded using a convolutional encoder, then interleaved and modulated using OFDM. Each logical stream is assigned a group of tones that carries the information.

The NRSC-5 system defines several modulation profiles (MPs). Each MP is defined based on the number of OFDM sub-carriers transmitted, the number of LCs transmitted, and the bit rate that each such LC provides. FIG. 2 is a chart that lists the different MPs, the LCs enabled in each service mode and the bit-rate of each LC.

FIG. 3 is a block diagram showing components of a typical RF receiver apparatus capable of receiving communication signals transmitted over RF and decoding an NRSC-5 transmission under the current state of the art. NRSC-5-compatible receivers may be deployed in a variety of products such as car radio, portable radios, MP3 players, cellular phones and navigation devices. In a typical usage model, the user of the receiver may only be using a single service out of the several services that an NRSC-5 system provides over a single physical channel provides.

A typical radio receiver under the current state of the art is comprised of a tuner and digital signal processing hardware (DSPHW). The tuner's purpose is to tune to a desired communication channel transmitted over a specific RF band, and to down-convert the signal to an intermediate frequency (IF) or to zero frequency (DC). The down-converted signal can then be sampled by one or two analog to digital converters (ADCs) to form a digital representation of the down-converted signal.

DSPHW is implemented with digital logic circuitry in order to demodulate the sampled signal and recover the information that was modulated in the transmitted signal. The DSPHW can be hard-wired digital logic, hard programmable digital logic, programmable processor or a combination of all. The radio receiver also implements an ADC control line between the DSPHW and the ADC. The radio receiver also implements a tuner control line between the DSPHW and the tuner. The DSPHW is capable of controlling the tuner and the ADC to configure them to the desired configuration for tuning and sampling of the desired channel. The DSPHW can be capable of controlling its own power consumption by gating the clocks into some of the digital circuits of the DSPHW when they are not otherwise in use.

For example, the radio receiver may receive a tune request from a user or an application, selecting a specific service existing in a specific physical channel. The selected service may be an audio service or a data service. The current NRSC-5 protocol does not provide a TOC of available services and their allocation to LCs. The radio receiver therefore needs to receive and decode the entire stream of bits belonging to all LC's comprised in the physical channel. The radio receiver then determines what audio services and data services are comprised in each LC, and extracts from one or more LC's the appropriate decoded data corresponding to the service in use.

When decoding each logical channel, the radio receiver will need to allocate a specific amount of memory for each logical channel. This memory will be used to buffer the data stream during the steps of demodulating and decoding the bit stream, until the requested data is extracted. An example of memory buffers allocated during the decoding process may be de-interleaver buffers, which can invert the interleaving process defined in the iBiquity Digital Corporation HD Radio™ Air Interface Design Description—Layer 1 FM of Mar. 22, 2005. A second example of memory buffers is layer 1 output buffers that store the content of one or more transfer frame bits. The transfer frame and transfer frame size is defined in the aforementioned reference.

There is a need in the art for an improved NRSC-5 receiver able to take advantage of the improved protocol in order to conserve power and memory.

SUMMARY OF THE CLAIMED INVENTION

A first claimed embodiment is for a method for digital radio broadcast transmission. Through the method, a table of contents message that identifies at least one of requested audio services and requested data services in one or more logical channels is created. The message and services are in an NRSC-5 standard digital radio broadcast transmission system. The TOC message is incorporated into a broadcast transmission and includes instructions to a receiver to limit decoding of bits to regions comprised in at least one of the one or more logical channels.

BRIEF DESCRIPTION OF THE DRAWINGS

FIG. 2 is a chart listing different MPs, LCs enabled in each service mode, and the bit-rate of each LC in the NRSC-5 standard.

FIG. 4 illustrates a Table of Contents (TOC) that may be generated and incorporated into a TOC message.

FIG. 5 illustrates an expanded TOC including service region information that may be generated and incorporated into a TOC message.

DETAILED DESCRIPTION

Figure 1:
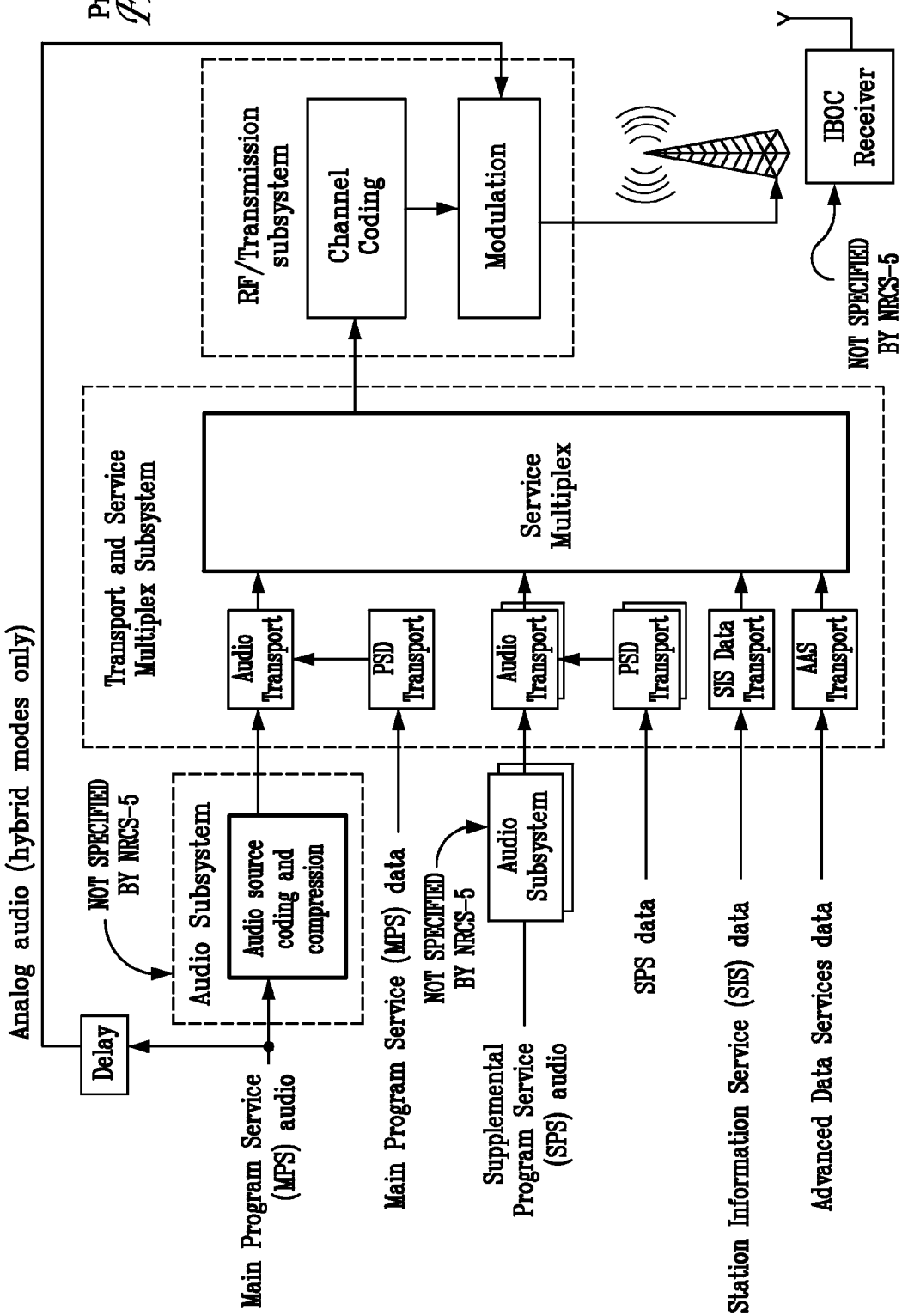
FIG. 1 illustrates an NRSC-5 IBOC system.
Figure 3:
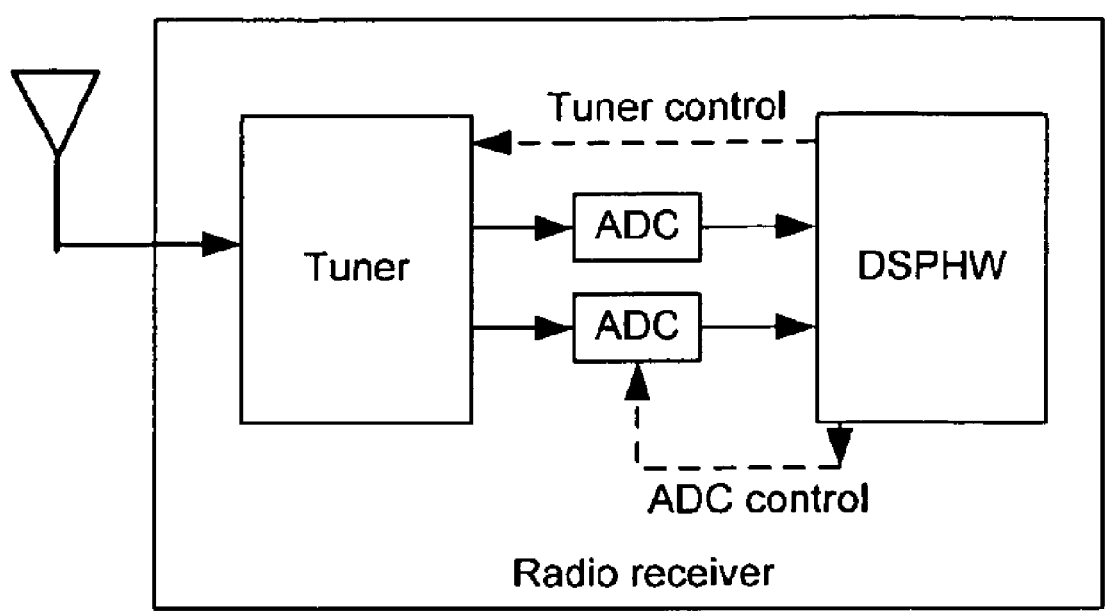
FIG. 3 is a block diagram showing components of a typical RF receiver apparatus capable of receiving communication signals transmitted over RF and decoding an NRSC-5 transmission.

For each audio and data service, the TOC of the presently disclosed invention may specify which logical channel may carry the data. The TOC may be transmitted over the NRSC-5 transmission system using a pre-defined protocol. The receiver may receive and decode the TOC. An NRSC-5 receiver apparatus may then extract the TOC. When a user or an application requests a specific service from the receiver, the receiver logic may examine the TOC and may identify which LC may carry the requested service data. The receiver may only decode the LCs that are needed for the requested service, and may not decode other unneeded LCs thereby conserving power and memory.

NRSC-5-compatible receivers may be deployed in a variety of products such as car radio, portable radios, MP3 players, cell phones and navigation devices. For many of these products, it may be desirable that the receiver consume as little power as possible, in order to conserve battery life. Therefore there is a need to reduce the power consumed by an NRSC-5 radio receiver. It may also be desirable to reduce the memory required to reliably demodulate the received signal in order to reduce the receiver cost as, in a typical usage model, the user of the receiver may only be utilizing a single service out of the several services that an NRSC-5 system provides over a single channel.

Embodiments of the present invention include an improved NRSC-5 transmission system, incorporating a TOC message. A radio frequency receiver apparatus capable of receiving NRSC-5 transmissions and capable of decoding the TOC uses TOC information to determine which logical channels carry data belonging to services that are currently being used by the receiver. The radio receiver may be capable of reducing the number of required processing cycles by demodulating and decoding only the logical channels that are currently in use. Furthermore, according to other embodiments of the invention the receiver may be capable of allocating de-interleaving buffers and Layer 2 buffers for only the logical channels that are currently in use, thereby conserving system memory.

According to embodiments of the invention, the transmission system may create a TOC message. The TOC message may identify audio services by their program number and may identify data services by their port number. The TOC message may indicate if the audio service stream is a core audio stream or an enhanced audio stream. The TOC message may be incorporated into an NRSC-5 transmission.

FIG. 4 shows an example of a TOC. After creating a TOC message, the transmission system can transmit a TOC message by several different methods using the NRSC-5 protocol. One exemplary method for transmitting a TOC message is an SIS message extension. The format for an SIS message extension is defined in the iBiquity Digital Corporation, HD Radio™ Air Interface Design Description—Station Information Service Protocol of Feb. 18, 2005. Each line entry in the TOC can be transmitted over one single SIS message. The transmission system may continue sending one or more TOC messages periodically, to maximize the likelihood that a radio recently tuned to the physical channel may receive the TOC message.

Some of the services comprised in a physical channel may have a known maximum transmission bit-rate. For example, an audio service may have an average transmission bit rate of 48 kilobytes per second (kbps), but may have a maximum bit rate of 50 kbps. If a service has a maximum bandwidth, the maximum number of bits in each logical channel frame that the service can occupy has a known limit. Therefore, the transmission system can allocate the services across the logical channels so that a service occupies a specific region within the frame. For example, data belonging to an audio service with a program number 1 can be allocated within the first 10 kilobytes of the frame of a logical channel (LC) P1. The transmission system can expand the TOC to further include information regarding the region within each logical channel frame in which data belonging to the corresponding service resides.

FIG. 5 illustrates an example of an expanded TOC incorporating information regarding service regions. An improved NRSC-5 receiver can extract and decode TOC messages received in a transmission as described herein. A radio receiver can implement a database containing TOCs of existing physical channels in the FM band. When the receiver is tuned to a physical channel, it can extract and decode a TOC message corresponding to that channel, and can update the database with the appropriate TOC. A TOC is associated in the database with the physical channel to which the TOC belongs. The radio receiver can maintain a list of existing physical channels. For one or more physical channels, the radio receiver can store the most recent TOC message extracted from that channel.

A radio receiver may implement a scan for services. In a scan for services, the radio receiver may search all possible channel frequencies for physical channels. When the radio detects a physical channel, it can extract the corresponding TOC message and add the TOC to the database. When the scan for services is completed, the database may contain the TOCs from all available physical channels. The radio receiver may maintain a TOC belonging to the physical channel to which the radio is tuned.

A radio receiver can construct a database of TOCs belonging to available physical channels. The receiver can first decode available LCs in one or more physical channels. The receiver can than parse the bit-stream from one or more logical channels to determine program numbers and port numbers comprised in the one or more logical channels. The receiver can then store this information in a TOC. For example, the radio receiver can receive a tuning request that can specify a physical channel frequency. The tuning request can also specify one or more specific services desired by a user or a higher application. The requested services can be identified by the corresponding program number, in the case of an audio service, or by the corresponding port number, in the case of a data service.

The radio receiver can examine the TOC corresponding to the channel currently in use. The radio receiver can read the LC number of each requested program number or port number and can create a list of LCs comprising one or more requested services that are currently in use. The radio receiver can demodulate, decode and extract bit streams from the logical channels that contain services in use, thereby conserving system resources that otherwise might be squandered processing bit streams from logical channels not containing requested services that are currently in use. In cases where a physical channel comprises more than one LC, for example, MP2, MP3, MP5, MP6, and MP11, some existing logical channels may not be decoded.

According to embodiments of the invention, a receiver employing the improvements described above can take advantage of cases where some of the logical channels are not decoded and can thereby reduce at least one of the number of computation cycles and the number of digital logical operations performed by the digital signal processing hardware.

The receiver can thereby take advantage of cases where some of the logical channels need not be decoded, saving on memory allocations. Only one or two logical channels may need to be decoded for a supported service. Accordingly, the receiver can be designed allocating memory for the decoding of one or two logical channels. Such a receiver may require less memory than would be needed for a comparable designed to decode all possible logical channels in all possible modulation profiles. Accordingly, such a modified receiver can save design costs by requiring a smaller memory. Further optimization of a radio receiver can be performed if the transmission system provides an expanded TOC that includes information on where service regions begin and end.

When the receiver receives a request for a specific service, the receiver can examine the TOC and then allocate the LC comprising the service. The receiver can also determine one or more regions of the LC comprising the service. The receiver can than de-interleave and decode only the bits comprised within the region corresponding to the requested service. At least one of the number of computation cycles and the number of digital logical operations in the decoding process is thereby reduced. The receiver can allocate de-interleaver memory and decoded frame buffers for the data within the region belonging to the requested service, thereby further reducing the memory required for the decoding and processing of the service data.

The embodiments disclosed herein are illustrative. Various modifications or adaptations of the structures and methods described herein may become apparent to those skilled in the art. Such modifications, adaptations, and/or variations that rely upon the teachings of the present disclosure and through which these teachings have advanced the art are considered to be within the spirit and scope of the present invention. Hence, the descriptions and drawings herein should be limited by reference to the specific limitations set forth in the claims appended hereto.

What is claimed is:

1. A method for transmission of a radio broadcast, the method comprising:
    creating a table of contents message, wherein the table of contents message includes information that identifies:
       a service in a logical channel, and
       information for a receiver apparatus to limit decoding of broadcast data to a region in a frame of a logical channel; and
    incorporating the table of contents message into a broadcast transmission, wherein the broadcast transmission includes a logical channel having a frame that includes broadcast data decoded by the receiver apparatus, whereby the table of contents message limits decoding of the broadcast data by the receiver apparatus to the region of the frame.

2. The method of claim 1, wherein the table of contents message is transmitted using a pre-defined National Radio Systems Committee 5 standard protocol.

3. The method of claim 1, wherein the table of contents message is transmitted using the Station Information Service data message extension of the National Radio Systems Committee 5 standard protocol.

4. The method of claim 1, wherein the service is an audio service.

5. The method of claim 4, wherein the information included in the table of contents message identifies the audio service as a core audio stream or an enhanced audio stream.

6. The method of claim 1, wherein the service is a data service.

7. The method of claim 1, wherein table of contents information includes a program number to identify the service as an audio service or includes a port number to identify the service as a data service.

8. A method for operating a radio receiver, the method comprising:
    receiving a tuning request that selects a service in a physical radio channel;
    decoding a table of contents message incorporated within a radio broadcast transmission, wherein the table of contents message includes information for the radio receiver to limit decoding of broadcast data to a region in a frame of a logical channel; and demodulating and decoding only the selected service from a logical channel associated with the physical radio channel, wherein decoding of the selected service is based on the information in the table of contents message.

9. The method of claim 8, wherein the table of contents information includes a program number to identify the service as an audio service or includes a port number to identify the service as a data service.

10. The method of claim 8, wherein information regarding the selected service is retrieved from a database of table of contents information of physical radio channels.

11. A method for selecting a service in a National Radio Systems Committee (NRSC) 5 standard transmission, the method comprising:
    receiving an NSRC-5 transmission at a receiver apparatus, the NSRC-5 transmission including broadcast data and a table of contents message that includes information identifying a service in a logical channel;
    decoding the table of contents message to:
        determine the logical channel that carries data belonging to the identified service, and
        retrieve information for the receiver apparatus to decode broadcast data in a region in a frame of the logical channel; and
    selecting a service from the NSRC-5 transmission.

12. The method of claim 11, wherein the selected service is the identified service.

13. The method of claim 11, further comprising updating a database containing table of contents information of physical radio channels, and wherein the selected service is based on the database.

14. The method of claim 13, further comprising:
    scanning multiple channel frequencies for physical channels;
    extracting table of contents information for physical channels; and
    updating a database containing table of contents information for physical channels.

15. A radio receiver, comprising:
    a tuner that receives a National Radio Systems Committee (NRSC) 5 standard transmission, wherein the transmission includes a logical channel having a frame that includes broadcast data decoded by the radio receiver; and
    digital signal processing hardware that:
        extracts a table of contents message from the NRSC 5 standard transmission, wherein the table of contents message identifies:
            a service in a logical channel, and
            information for the radio receiver to limit decoding of broadcast data to a region in the frame of the logical channel; and
        selects a service from the NSRC 5 standard transmission.

16. The radio receiver of claim 15, further comprising a database containing table of contents information of physical radio channels, and wherein the service is selected based on the database.

17. The radio receiver of claim 15, wherein the digital signal processing hardware controls the tuner through a tuner control line.

18. A computer readable storage medium having embodied thereon a program, the program being executable by a processor to perform a method for transmission of a radio broadcast, comprising:
    creating a table of contents message, wherein the table of contents message includes information that identifies:
        a service in a logical channel, and
        information for a receiver apparatus to limit decoding of broadcast data to a region in a frame of a logical channel; and
    incorporating the table of contents message into a broadcast transmission, wherein the broadcast transmission includes a logical channel having a frame that includes broadcast data decoded by the receiver apparatus, whereby the table of contents message limits decoding of the broadcast data by the receiver apparatus to the region of the frame.

19. The computer readable storage medium of claim 18, wherein the service is an audio service.

20. The computer readable storage medium of claim 18, wherein the service is a data service.

21. A computer readable storage medium having embodied thereon a program, the program being executable by a processor to perform a method for selecting a service in a National Radio Systems Committee (NRSC) 5 standard transmission, comprising:
    receiving an NSRC-5 transmission that includes broadcast data and a table of contents message, the table of content message including information that identifies a service in a logical channel;
    decoding the table of contents message to:
        determine the logical channel that carries data belonging to the identified service, and
        retrieve information for decoding broadcast data in a region in a frame of the logical channel; and
    selecting a service from the NSRC-5 transmission.

22. The computer readable storage medium of claim 21, wherein the selected service is the identified service.

23. The computer readable storage medium of claim 21, the method further comprising updating a database containing table of contents information of physical radio channels, and wherein the selected service is based on the database.

\* \* \* \* \*